(12) United States Patent
McCarty et al.

(10) Patent No.: US 10,448,103 B2
(45) Date of Patent: *Oct. 15, 2019

(54) METHODS AND SYSTEMS FOR SELECTING A MEDIA CONTENT ITEM FOR PRESENTATION DURING A TRIP

(71) Applicant: Rovi Guides, Inc., San Jose, CA (US)

(72) Inventors: Michael McCarty, Agoura Hills, CA (US); Timothy A. Holmes, Eugene, OR (US); Glen E. Roe, Simi Valley, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,652

(22) Filed: Sep. 19, 2018

(65) Prior Publication Data
US 2019/0246175 A1    Aug. 8, 2019

Related U.S. Application Data

(63) Continuation of application No. 15/887,412, filed on Feb. 2, 2018, now Pat. No. 10,123,078.

(51) Int. Cl.
| | |
|---|---|
| *H04N 21/458* | (2011.01) |
| *H04N 21/414* | (2011.01) |
| *H04N 21/466* | (2011.01) |
| *G06K 9/00* | (2006.01) |
| *H04N 21/45* | (2011.01) |

(52) U.S. Cl.
CPC ..... *H04N 21/4583* (2013.01); *G06K 9/00718* (2013.01); *H04N 21/41422* (2013.01); *H04N 21/4524* (2013.01); *H04N 21/4668* (2013.01); *G06K 2009/00738* (2013.01)

(58) Field of Classification Search
None
See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |
| 7,165,098 B1 | 1/2007 | Boyer et al. |

(Continued)

OTHER PUBLICATIONS

Envisioning the Car of the Future as a Living Room on Wheels—The New York Times https://www.nytimes.com/2017/06/15/automobiles/wheels/driverless-cars-interior.html Nov. 10, 2017, 5 pages.

*Primary Examiner* — Jason K Lin
(74) *Attorney, Agent, or Firm* — Haley Guiliano LLP

(57) ABSTRACT

Systems and methods are described for selecting media content based on travel information. A set of media content items is maintained. Each media content items having a respective associated spoiler metadata item that lists a spoiler time value that corresponds to a time when a spoiler event occurs in a respective media content item. Travel information related to a planned trip is received from a user. A trip duration value is determined based on the received travel information. The trip duration value is compared to a spoiler time value of a spoiler metadata item associated with a media content item of the set of media content items. In response to determining that the spoiler time value exceeds the trip duration value, the media content item is provided for display during the planned trip.

20 Claims, 8 Drawing Sheets

(56) References Cited

U.S. PATENT DOCUMENTS

| | | |
|---|---|---|
| 7,761,892 B2 | 7/2010 | Ellis et al. |
| 8,046,801 B2 | 10/2011 | Ellis et al. |
| 8,216,036 B2 | 7/2012 | Eyzaguirre et al. |
| 9,272,708 B2 | 3/2016 | Cuddihy et al. |
| 2002/0174430 A1 | 11/2002 | Ellis et al. |
| 2005/0251827 A1 | 11/2005 | Ellis et al. |
| 2009/0208180 A1* | 8/2009 | Ashby ............... H04N 21/235 386/248 |
| 2010/0153885 A1 | 6/2010 | Yates |
| 2012/0304043 A1* | 11/2012 | Shahraray ........... G11B 27/034 715/202 |
| 2014/0281971 A1* | 9/2014 | Isbell, III ............ G11B 27/034 715/716 |
| 2014/0298169 A1* | 10/2014 | Williams ......... H04N 21/25841 715/716 |
| 2015/0254051 A1* | 9/2015 | Panguluri ................ G06F 3/16 700/94 |
| 2015/0350709 A1* | 12/2015 | Tomita ............ H04N 21/26283 725/32 |
| 2016/0105734 A1* | 4/2016 | Packard .......... H04N 21/25841 725/32 |
| 2017/0309072 A1 | 10/2017 | Li et al. |
| 2017/0366859 A1* | 12/2017 | Chimayan ........ H04N 21/47217 |
| 2018/0199102 A1* | 7/2018 | Gross ................ H04N 21/2187 |

\* cited by examiner

METHODS AND SYSTEMS FOR SELECTING A MEDIA CONTENT ITEM FOR PRESENTATION DURING A TRIP

CROSS-REFERENCE TO RELATED APPLICATIONS

This application is a continuation of U.S. patent application Ser. No. 15/887,412 (now U.S. Pat. No. 10,123,078), filed Feb. 2, 2018 the disclosure of which is hereby incorporated by reference herein in its entirety.

BACKGROUND

Modern vehicle systems may have entertainment features that are accessible to users for the duration of the trip. For example, users ho are passengers can view media content on screens built into the vehicle in addition to viewing media content on personal user devices. As cars become more and more automated, the demand for in-trip entertainment is increasing. Fully autonomous (self-driving) vehicles do not require a driver and thus may provide entertainment options for all passengers. Additionally, autonomous vehicles may include screens where previously unfeasible, e.g., on the windshield or a side window. Furthermore, modern vehicle systems often have access to the trip itinerary data. Modern vehicle systems may, at best, select media content to fill up the trip duration. However, vehicle systems lack any way to intelligently select media content for presentation in order to take advantage of the trip itinerary data to maximally interest the viewer and incentivize the user to continue watching the media content after the present trip is over.

SUMMARY

To this end and others, systems and methods are provided that improve the media content item selection for presentation inside a vehicle during a trip. In some embodiments, the media guidance application may maintain a list of media content items (e.g., movies or TV shows). Each media content item may include at least one time associated with a spoiler (e.g., a movie may have cliffhanger moment that is subsequently resolved at the spoiler point). When the user requests a ride in a vehicle (e.g., a taxi service vehicle or an autonomous vehicle), the media guidance application may determine the expected duration of the trip. The media guidance application may then select a media content item such that the spoiler is expected to occur after the completion of the trip (e.g., a trip provided by a ride sharing service such as Lyft or Uber). Such selection significantly improves the operation of the media guidance application, by making sure that the user is maximally motivated to continue watching the same media content item during the next trip. In addition, if the vehicle is a taxi service vehicle or an autonomous vehicle owned by a taxi company, the user will be motivated to use the services of the same taxi company during the next trip in order to resume watching the paused media content item.

In some embodiments, a media guidance application maintains a set of media content items. In some embodiments, the set of media content items may be stored in local memory or on a remote storage device. In some embodiments, each of the media content items may be associated with a respective spoiler metadata items that may comprise a spoiler time value that corresponds to a time when a spoiler event occurs in a respective media content item. For example, one of the media content items may be a movie where an intense cliffhanger scene lasts from the 20-minute mark to the 25-minute mark. At the 25 minutes 30 seconds mark, the cliffhanger scene is resolved. In this embodiment, this media content may have a spoiler metadata item that comprises a spoiler time value of "25 minutes 30 seconds."

In some embodiments, the media guidance application may receive travel information related to a planned trip from a user. For example, the user may enter the destination address via a touchscreen interface inside an autonomous vehicle. In some embodiments, the user may input the destination address via a personal user device (e.g., a smartphone). In some embodiments, the media guidance application may determine the origin location based on GPS data from the user device.

In some embodiments, the media guidance application may then determine a trip duration value based on the received travel information. For example, the media guidance application may determine the distance and route based on the destination and origin location. In some embodiments, the media guidance application may also determine current or historical traffic patterns. In some embodiments, the media guidance application may then use the route information and traffic data to determine the trip duration value (e.g., "24 minutes.").

In some embodiments, the media guidance application may compare the trip duration value to a spoiler time value of a spoiler metadata item associated with a media content item of the set of media content items. For example, the media guidance application may compare the trip duration value (e.g., "24 minutes"). to the spoiler time value of "25:30" of a particular media content item (e.g., a movie). In this example, the media guidance application may determine that the that the spoiler time value exceeds the trip duration value.

In some embodiments, the media guidance application may, in response to determining that the spoiler time value exceeds the trip duration value, provide the media content item for display during the planned trip. For example, the media guidance application may display the particular media content item on a screen within the vehicle that is used by the user to go on the planned trip. In some examples, when the vehicle is an autonomous vehicle, the media guidance application may display the particular media content item on a side window or a windshield of the vehicle (or a screen built into the vehicle at another location). In some embodiments, the media guidance application may display the particular media content item on a display of a user device, when the user device is determined to be in proximity to the vehicle.

In some embodiments, a media guidance application may store a set of media content items (e.g., movies, songs, TV episodes, etc.). In some embodiments, the media guidance application may store the media content items in a local storage. In some embodiments, the media guidance application may store pointers to media content items stored on a remote server.

In some embodiments, the media guidance application may, for each particular media content item of the set of media content items, identify a time when a spoiler event occurs in the particular media content item. In some embodiments, the media guidance application may identify a time when a spoiler event occurs based on an explicit input identifying the time. In some embodiments, the media guidance application may analyze metadata related to the media content item to determine such time, for example by analyzing associated social network data.

In some embodiments, the media guidance application may, for each particular media content item of the set of media content items, generate a respective spoiler metadata item that comprises a spoiler time value indicative of the identified time. For example, if the media guidance application determines that a movie includes a spoiler event that occurs at a 25 minute, 30 second mark, the media guidance application may generate a metadata data structure associated with that movie, such that the metadata data structure stores the "25 minutes, 30 seconds" time value.

In some embodiments, the media guidance application may receive travel information related to a planned trip from a user. For example, a user may use a mobile app to request a car ride from a geographical point A (e.g., user's home) to a geographical point B (e.g., user's place of work). In some embodiments, the media guidance application may then receive the geographical locations of points A and B from the mobile application. In some embodiments, the media guidance application may also determine the location of point A based on GPS data received from a user device, or from a vehicle that picks up the user.

In some embodiments, the media guidance application may determine a trip duration value based on the received travel information. For example, the media guidance application may use a map engine to calculate a trip time from geographical point A to geographical point B. In some embodiments, the media guidance application may use additional data, like historical or current traffic conditions. For example, the media guidance application may calculate that a trip from Point A to Point B is expected to take 30 minutes. In this example, the media guidance application may store the trip duration value of "30 minutes."

In some embodiments, the media guidance application may identify a subset of the set of media content items. In some embodiments, the media guidance application may do so by comparing the trip duration value to a spoiler time value of a spoiler metadata item associated with the particular media content item, for each particular media content item of the set of media content items. For example, the set of content items may include a first movie and a second movie. The first movie may be associated with a metadata item that stores the spoiler time value of "25 minutes." The second movie may be associated with a metadata item that stores the spoiler time value of "35 minutes." In this example, the media guidance application may compare the spoiler time values for each movie to the trip duration value of (e.g., the value of "30 minutes."

In some embodiments, the media guidance application may, in response to determining that the spoiler time value exceeds the trip duration value, add the particular media content item to the subset. For example, since the trip duration value of "30 minutes" exceeds the spoiler time value of "25 minutes," the media guidance application may add the first movie to the subset. In this example, since the trip duration value of "30 minutes" does not exceed the spoiler time value of "35 minutes," the media guidance application may not add the second movie to the subset.

In some embodiments, the media guidance application, the media guidance application may select an optimal media content item from the subset. For example, the media guidance application may select a media content item that matches the user profile the best.

In some embodiments, the media guidance application may provide the optimal media content item for display during the planned trip. For example, the media guidance application may display the particular media content item on a screen within the vehicle that is used by the user to go on the planned trip. In some examples, when the vehicle is an autonomous vehicle, the media guidance application may display the particular media content item on a side window or a windshield of the vehicle. In some embodiments, the media guidance application may display the particular media content item on a display of a user device, when the user device is determined to be in proximity to the vehicle or inside the vehicle.

In some embodiments, the media guidance application may determine the trip duration value using the following steps. In some embodiments, the media guidance application may determine a travel route based on the travel information. For example, if the travel information comprises a request for a car ride from geographical point A to a geographical point B, the media guidance application may calculate the travel route based on accessing a map data database. In some embodiments, the media guidance application may send a request for the travel route to a commercial map data provider (e.g., Google Maps) and receive the travel route from the commercial map data provider. In some embodiments, the media guidance application may determine traffic conditions along the travel route. For example, the media guidance application may access historical traffic information, or receive current traffic information from a third-party service. In some embodiments, the media guidance application may then calculate the trip duration value based on travel route and traffic conditions. For example, five minutes per mile may be added to the trip duration if the traffic is predicted to be heavy.

In some embodiments, the media guidance application may identify a time when a spoiler event occurs in the particular media content item using the following steps. In some embodiments, the media guidance application may receive social media data associated with a particular media content item. For example, the media guidance application may receive social network data indicating social network activity while the particular media content item was broadcast on a television network. For example, social network data may indicate how many social network posts mentioned the particular media content item, during every minute the particular media content item was broadcast.

In some embodiments, the media guidance application may identify an increase in social media activity based on social media data. For example, the media guidance application may determine that at minute 30 of the showing of the particular media content, the amount of mentions of the particular media content has spiked when compared to adjacent minutes (e.g., 29 minutes and 31 minutes). In some embodiments, the media guidance application may then identify a time associated with the increase in social media activity as the time when a spoiler event occurs. In this example, the media guidance application may identify "30 minutes" as the time when the spoiler event occurs.

In some embodiments, the media guidance application may select an optimal media content item from the subset using the following steps. In some embodiments, the media guidance application may maintain user preference data. For example, the user preference data may store movie genres preferred by the user, actors preferred by the user, or any other preference keywords. In some embodiments, the media guidance application may then generate a preference score for each media content item from the subset by matching metadata of that media content item with the user preference data. For example, if the user preference data includes the genre "comedy," the media guidance application may assign higher scores to media content items that have metadata with keywords "comedy" or "funny." In some embodiments, the media guidance application may then select the media content item with the highest preference score as the optimal media content item.

In some embodiments, the media guidance application may select an optimal media content item from the subset by identifying a media content item with an associated spoiler time value that is closest to the trip duration value. For example, the subset of content items may include a first movie and a second movie. The first movie may be associated with a metadata item that stores the spoiler time value of "32 minutes." The second movie may be associated with a metadata item that stores the spoiler time value of "34 minutes." The trip duration value may be "30 minutes." In this example, the media guidance application may select the second movie as the optimal media content, because the spoiler time value of "32 minutes" is closer to the trip duration value of "30 minutes" than spoiler time value of "34 minutes."

In some embodiments, a planned trip may comprise a trip via an autonomous vehicle. For example, the user may select the trip via an interface placed in the vehicle. In some embodiments, the user may select the trip via a personal user device (e.g., a smartphone). In some embodiments, the media guidance application may provide the optimal media content item for display, which comprises displaying the media content item on a screen within the autonomous vehicle. For example, the side windows, the windshield, or the combination of the above may act as a screen.

In some embodiments, the media guidance application may determine that a user device is proximate to an autonomous vehicle. For example, the media guidance application may use GPS data from the user device and from the autonomous vehicle to make the determination. In some embodiments, the media guidance application may use near-field commutation NFC transceivers built into the user device and into the autonomous vehicle to make the proximity determination. In some embodiments, the media guidance application may, in response to determining that the user device is proximate to the autonomous vehicle, provide the optimal media content item for display on the user device. For example, the media guidance application may only display the media content item on the user device when the user is near or inside the autonomous vehicle.

In some embodiments, the media guidance application may determine that a user device is no longer proximate to the autonomous vehicle. For example, in some embodiments, the media guidance application may make such a determination using GPS or NFC data. In some embodiments, the media guidance application may then, in response to determining that the user device is no longer proximate to the autonomous vehicle, stop providing the optimal media content item. For example, the media guidance application may stop providing the media content when the user exits the vehicle. In some embodiments, the media guidance application may stop providing the media content when it reaches the time when a spoiler event occurs.

In some embodiments, the media guidance application may pause the providing of the optimal media content item when the planned trip ends. In some embodiments, the media guidance application may also store a bookmark corresponding to the pause time. For example, if the media content item was paused at the 30-minute mark, the media guidance application may store a bookmark data structure that contains "30 minutes" value. In some embodiments, the media guidance application may resume providing the optimal media content item from the time identified by the stored bookmark when a user's next trip begins. For example, when the user requests another trip with the same taxi company that provided the vehicle for the first trip, the media guidance application may resume providing the media content when a second trip begins. In some embodiments, the media guidance application may resume providing the media content item past the point when a spoiler event occurs only during the second trip.

In some embodiments, the media guidance application may, after a predetermined time period (e.g., two days) has passed, but before the user's next trip begins, transmit a reminder to a user device. For example, the media guidance application may send an SMS message, an email, or an app notification to the user device. In some embodiments, the reminder may comprise data identifying the optimal media content item and spoiler information corresponding to the spoiler time value. For example, the media guidance application may send a reminder that includes the text "Find out what happens in a 'Movie A' after 'Event X.'" where a real title of movie is substituted for "Movie A" and a real description of a spoiler event is substituted for "Event X."

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
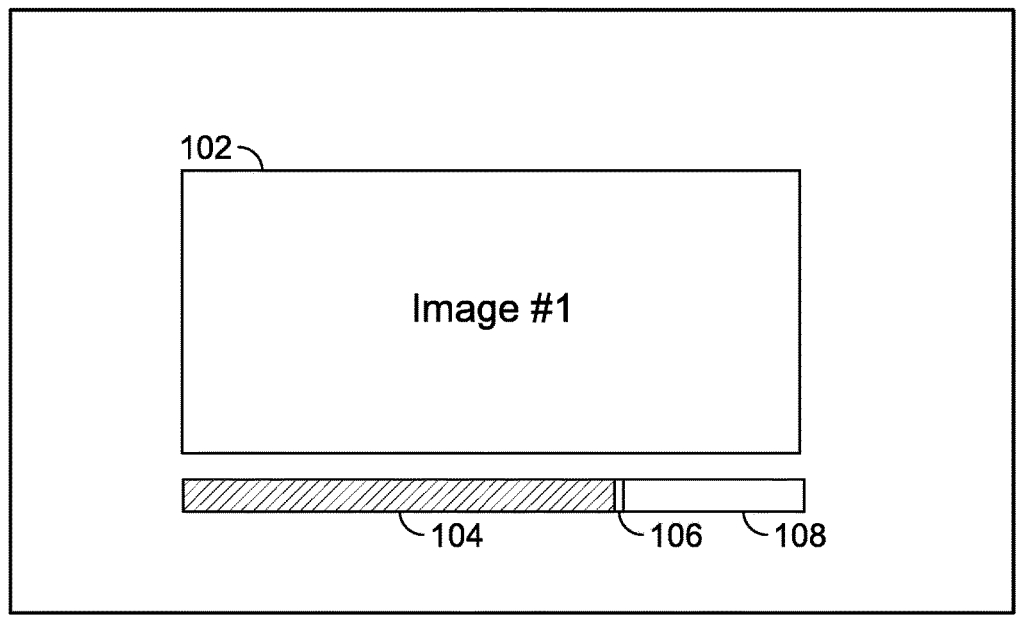
FIG. 1A shows an illustrative embodiment of a display screen that may be used to provide a media content item during a trip, in accordance with some embodiments of the disclosure.

Systems and methods are disclosed herein for an improved technique for selecting media content based on the user's travel information, to be displayed to the user during the planned trip. The technique provides an improved selection of the media content by selecting content items to maximize the user's interest in the media content after the trip is over, and to encourage the user to seek to continue watching the media content item.

In some embodiments, the media guidance application may maintain a library of media content items (e.g., movies). Each media content item may have an associated spoiler time value, indicating when a spoiler occurs. The media guidance application may receive planned trip information from the user. For example, the user may request a ride from a taxi company (e.g., a company that provides transportation via autonomous vehicles) and provide origin and destination information. The media guidance application may then calculate the duration of the trip. The media guidance application may then select a media content item for presentation during the trip (e.g., a ride in an autonomous vehicles) such that a spoiler is expected to occur after the conclusion of the trip. In this way, the user may be motivated to select the same taxi company for the next trip, in order to continue watching the media content item.

As referred to herein, the term "spoiler" refers to any occurrence in a media content item (e.g., a movie, a TV show, an audiobook, etc.) that resolves a mystery or a cliffhanger event that occurred earlier in the media content item. For example, a spoiler event may refer to an event where the identity of a criminal is revealed, a mystery is resolved, or a character previously thought to be dead is revealed to be alive.

As referred to herein, the term "autonomous vehicle" refers to any kind of transportation device that may operate without direct control by a human driver. For example, "autonomous vehicle" may refer to a self-driving car.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 1A shows an illustrative media guidance interface on a display screen that may be used to provide a media content item during a trip, in accordance with various embodiments of the disclosure. In some embodiments, display 100 may display the media content item provided by the media guidance application. For example, display 100 may display image 102. Image 102 may be a part of media content item provided by the media guidance application. In some embodiments, the media content item may be provided to display 100 during a trip undertaken by a user. In some embodiments, display 100 may be located inside a vehicle that is used for the trip. In some embodiments, the vehicle may be an autonomous vehicle.

In some embodiments, display 100 may optionally include navigation bar 108, which shows the progress of presentation of the media content item. In some embodiments, navigation bar 108 may include a present time indicator 106, and indication 104 of how much of the media content was already played. For example, indication 104 may comprise a different color or pattern when compared to the rest of the navigation bar 108.

In some embodiments, the media guidance application may select the media content item for presentation on display 100 based on travel information related to a planned trip from a user. For example, the user may use a user device to request a trip from a taxi company that provides autonomous vehicles. In some embodiments, the media guidance application may receive this trip information.

In some embodiments, the media guidance application may calculate a trip duration value based on the received travel information. For example, the media guidance application may use a commercial map engine to estimate a length of a trip between the origin point of the user and the intended destination of the user.

In some embodiments, the media guidance application may select a media content item for presentation such that the media content item would contain a spoiler that occurs after the conclusion of the trip. For example, if the trip is expected to take 20 minutes, the media guidance application may select a media content item for presentation, in which the spoiler occurs at the 22-minute mark.

In some embodiments, time indicator 106 indicates the point where the spoiler occurs. In some embodiments, the media guidance application may stop providing the media content item to display 100 before or as soon as the time indicated by time indicator 106 is reached. For example, if the spoiler occurs at the 22-minute mark, the media guidance application may stop presenting the media content before or at the 22-minute mark. In some embodiments, the media guidance application may stop providing the media content item due to the trip ending. In some embodiments, the media guidance application may stop providing the media content item even if the trip is not over due to unforeseen circumstances (e.g., unexpected traffic).

In some embodiments, the trip duration may change (e.g., due to traffic conditions or other factors). For example, the media guidance application may have estimated, prior to the trip, that the trip is expected to take 20 minutes. Later, the media guidance application may, while the trip is in progress, update the trip length estimate. For example, the media guidance application may determine that the trip will take 4 minutes more (e.g., due to an unexpected stop), or 3 minutes less (e.g., due to an unusually light traffic). In some embodiments, the media guidance application may then modify the presentation of the media content item such that the media content item will finish played as close to the spoiler as possible, without the spoiler being revealed during the trip.

In some embodiments, the media guidance application may accomplish such modification to the presentation of the media content item (e.g., a movie or a VR experience) by dynamic tuning of the presentation of the media content item. For example, the media guidance application may start adding frames and/or increasing cut times if the ride is expected to be longer than estimated. Attentively, the media guidance application may start removing frames and/or decreasing cut times if the ride is expected to be shorter than estimated.

In some embodiments, the media guidance application may have access to several edited versions of the media content item, where each version is split into a plurality of scenes in different ways. The media guidance application, may then dynamically select the next scene based on the real-time information regarding the length of trip and based on the length of each scene. In some embodiments, each scene of the media content item may have an associated priority value. In some embodiments, scenes that precede scenes that contain a spoiler may be assigned a higher priority value. In some embodiments, the media guidance application may select the next scene based on the real-time information regarding the length of trip and based on the priority of each scene, where the scenes with higher associated priority values are more likely to be selected than scenes with lower associated priority values.

Figure 1B:
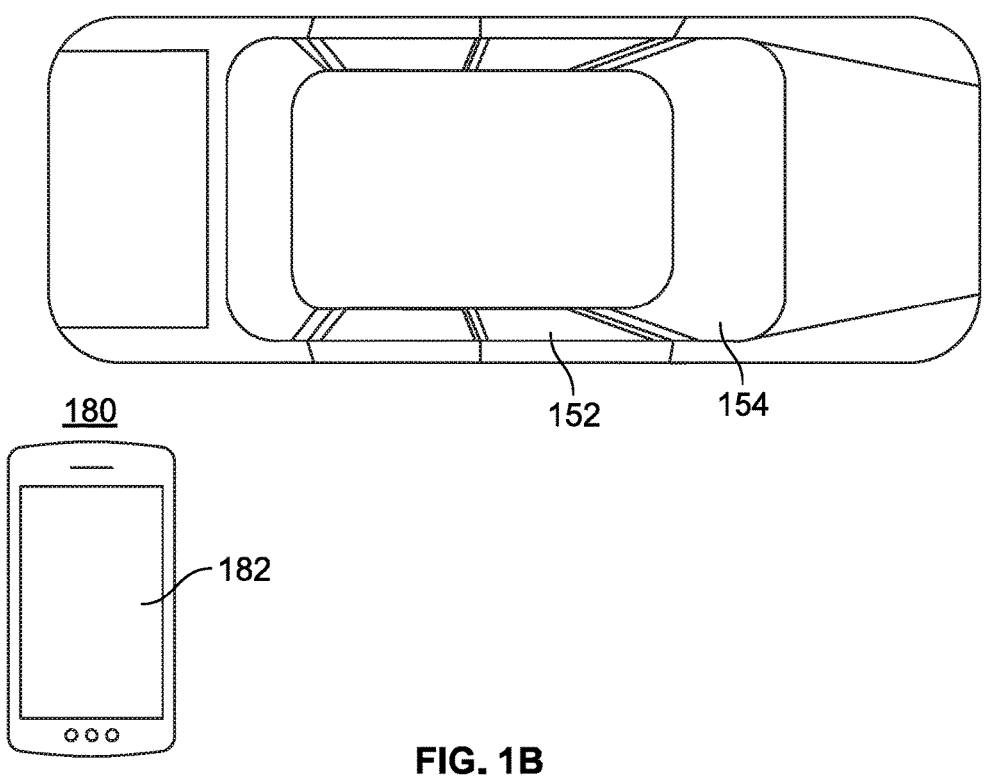
FIG. 1B shows an illustrative diagram of exemplary devices that may include a display screen that may be used to provide a media content item, in accordance with some embodiments of the disclosure.

FIG. 1B shows an illustrative diagram of exemplary devices that may include a display screen that may be used to provide a media content item, in accordance with some embodiments of the disclosure. In some embodiments, display 100 may be a part of vehicle 150. For example, if vehicle 150 is an autonomous vehicle, display 100 may be built into window 152 of vehicle 150, any other windows of vehicle 150, or into windshield 154. In some embodiments, display 100 may be built into the interior of vehicle 150. In some embodiments, display 100 may be a part of user device 180. For example, user device 180 may include an LCD display 182 that includes display 100.

In some embodiments, the media guidance application may be executing on a processor that is located inside vehicle 150. In some embodiments, the media guidance application may be executing on a processor at a remote location, but be in communicative connection with vehicle 150 or user device 180.

In some embodiments, the media guidance application may provide additional features to vehicle 150 (e.g., an autonomous vehicle). In some embodiments, the media guidance application may provide Virtual Reality (VR) or Augmented Reality (AR) media content to a user riding in a vehicle 150, e.g., via displays 152 and 154.

In some embodiments, vehicle 150 may include an array of sensors (e.g., cameras, IR sensors, sound sensors, etc.) In some embodiments, the array of sensors may be used by the media guidance application to scan the environment surrounding vehicle 150 during a trip to identify objects, and store a rotating catalogue of identified objects. For example, nearby cars may be detected and catalogued.

In some embodiments, when a user is riding in vehicle 150, the media guidance application may present a menu (e.g., via screen 100) to the user listing a set of media experiences available for the user to engage in. In some embodiments, the user may be able to select an experience from a displayed catalog of AR or VR offerings.

In some embodiments, the media guidance application may incorporate data acquired via the array of sensors into a selected CR or AR experience. For example, the media guidance application may create an experience for the rider as if they were commuting in the "Fifth Element's" futuristic New York, a "Star Wars" Coruscant world, or a "Jurassic Park" world. For example, the media guidance application may overlay appropriate texture over some of the identified objects. For example, all nearby cars may be overlaid with a texture making them appear as space ships.

In some embodiments, the media guidance application may synchronize the AR or VR experience with movement information. For example, if the media guidance application detects that the vehicle is moving downhill (e.g., via a GPS sensor or an accelerometer), the media guidance application may modify the display of the AR or VR experience such that the user can see downhill movement (e.g., on display 152). Similarly, if the media guidance application detects that the vehicle is moving uphill (e.g., via a GPS sensor or an accelerometer), the media guidance application may modify the display of the AR or VR experience such that the user can see uphill movement (e.g., on display 152).

In some embodiments, the media guidance application may further modify the AR or VR experience based on smell or sound information detected by the array of sensors. For example, if a sweet smell is detected, the media guidance application may make the interior of a car appear as a bakery. In some embodiments, if a loud noise is detected, the media guidance application may display a cartoon explosion animation on display 100.

In some embodiments, the media guidance application may create an AR experience, where information related to identified objects is overlaid over the objects. For example, names of important landmarks may appear over such landmarks.

In some embodiments, the media guidance application may provide a game experience to a user riding in vehicle 150. For example, a user may be asked to tag "objectives" identified by the media guidance application. For example, if the user is a child, the media guidance application may challenge the user to a game of "I see something blue," where the user is challenged to tap several blue objects appearing outside the vehicle. In some embodiments, the user may be asked to identify a specific person outside the vehicle. The user may be able to make the indications by tapping on window 152.

In some embodiments, the media guidance application may replace real world objects with different apparent objects. For example, a billboard appearing outside of a vehicle maybe be overlaid with an advertisement that is more relevant to the user than the real-world advertisement.

In some embodiments, the media guidance application may offer sale or microtransactions offers to the user related to objects detected outside of vehicle 150. For example, if there is a billboard advertising a show, a user may be offered to buy tickets to such a show.

Figure 2:
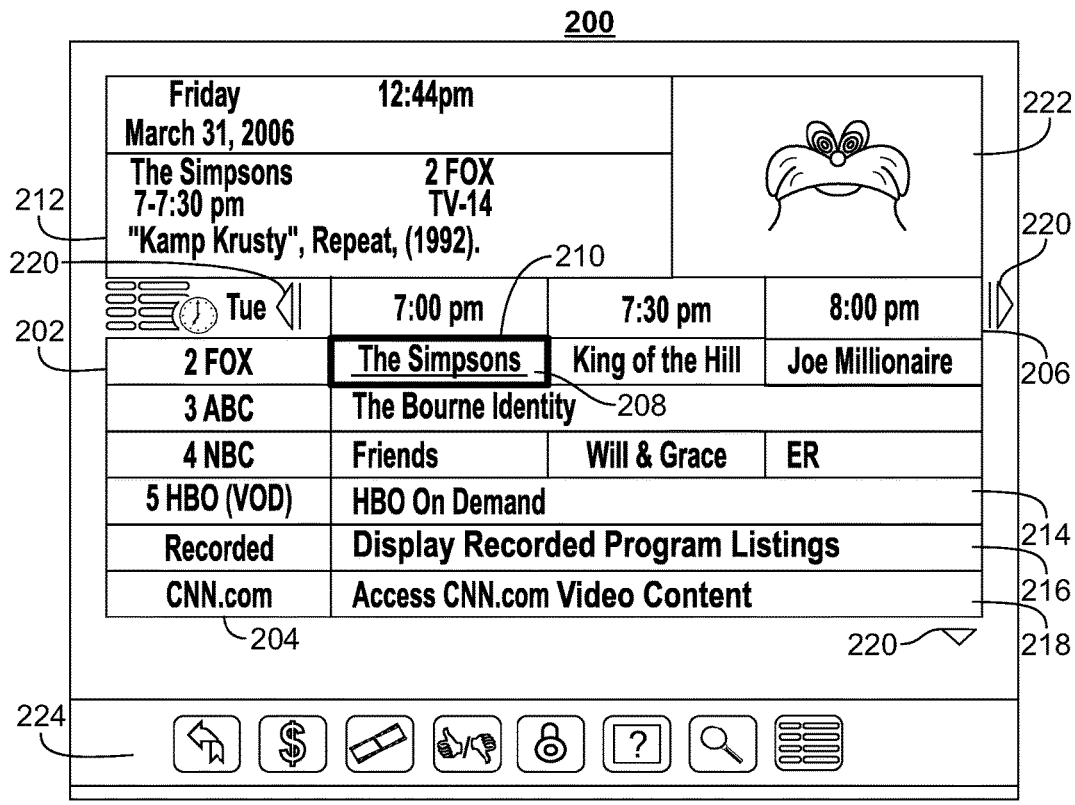
FIG. 2 shows another illustrative media guidance interface that may dynamically include or exclude a video, in accordance with some embodiments of the disclosure.
Figure 3:
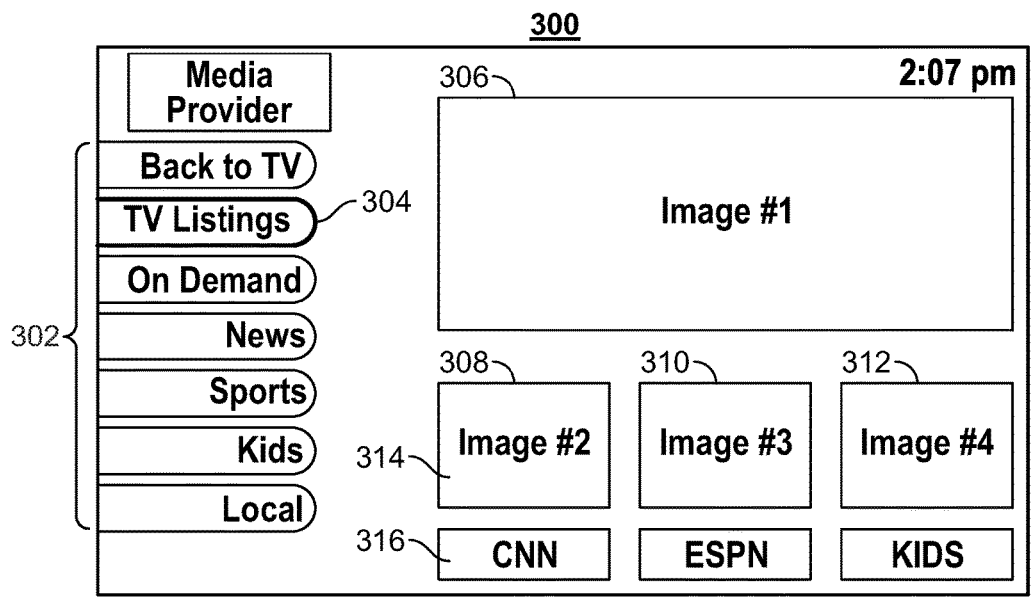
FIG. 3 shows yet another illustrative media guidance interface that may dynamically include or exclude a video, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/

0153885, filed Nov. 12, 2009, which is hereby incorporated by reference herein in its entirety.

Figure 4:
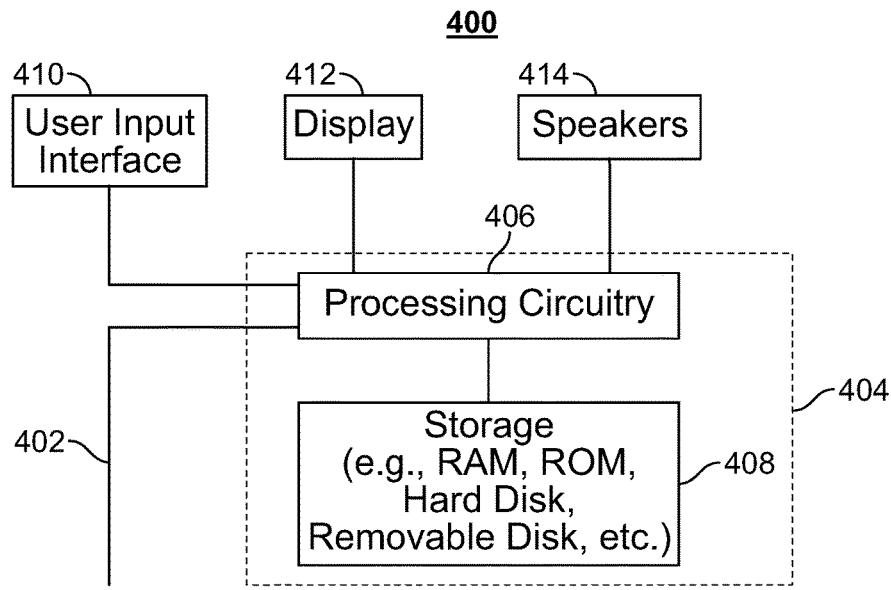
FIG. 4 is a block diagram of an illustrative user equipment device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
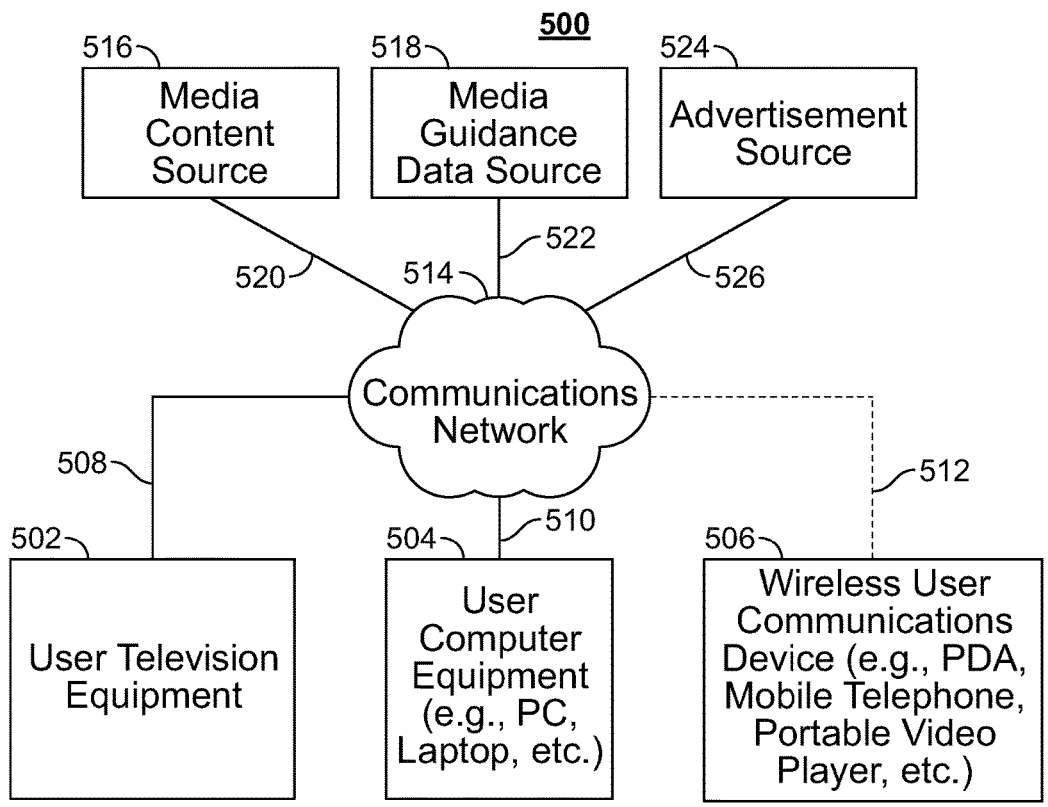
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Detailed descriptions of FIGS. 6-12 are provided below. It should be noted that processes 600-1200, or any step thereof, could be performed on, or provided by, any of the devices shown in, or described with respect to, FIGS. 4-5. For example, either process 600 or process 700 may be executed by control circuitry 404 (FIG. 4) as instructed by media guidance application(s) implemented on user equipment 502, 504, and/or 506 (FIG. 5). In addition, one or more steps of processes 600 and 700 may be incorporated into, or combined with, one or more steps of any other process or embodiment.

Figure 6:
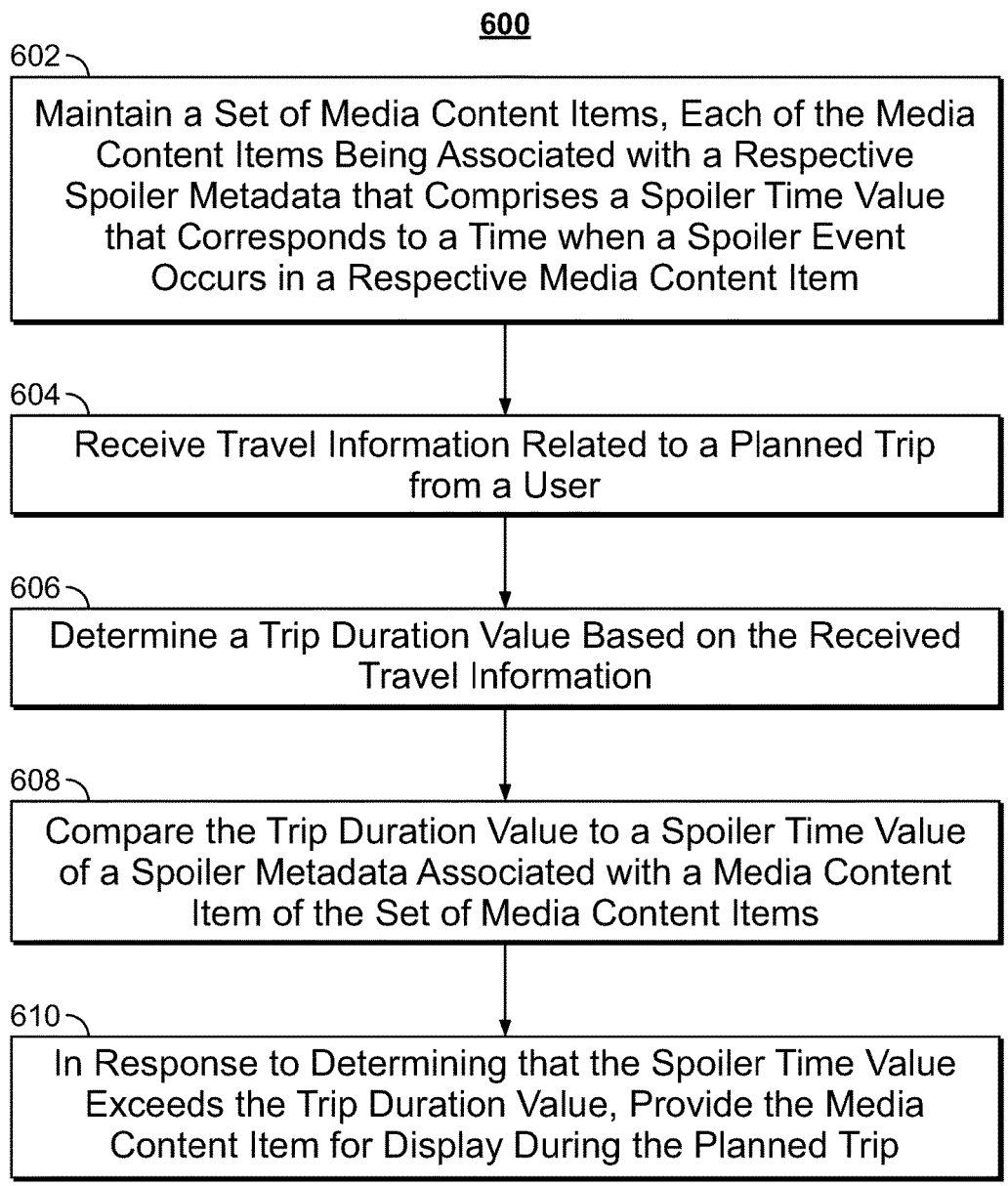
FIG. 6 depicts an illustrative flow diagram for a process of selecting and providing for display a media content item during a trip, in accordance with some embodiments of the disclosure.

FIG. 6 depicts an illustrative flow diagram of a process 600 for selecting and providing for display a media content item during a trip in accordance with an embodiment of the disclosure. Process 600 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 600 begins at 602, where control circuitry 404 maintains a set of media content items. For example, control circuitry 404 may maintain a library of media content items in storage 408. In another example, control circuitry 404 may have access to a library of media content items at media content source 516. In some embodiments, each of the media content items is associated with a respective spoiler metadata item that comprises a spoiler time value that corresponds to a time when a spoiler event occurs in a respective media content item. For example, control circuitry 404 may have access to metadata items in a form of a table (e.g., Table 1) that stores spoiler data for the set of media content items (e.g., Movie A, Movie B, and TV Show A).

TABLE 1

| Media Content Item | Spoiler Time Value | Spoiler Description |
| --- | --- | --- |
| Movie A | 25 minutes | Villain revelation |
| Movie B | 30 minutes | Mystery revelation |
| TV Show A | 15 minutes | Character being alive revelation |

Process 600 continues at 604, where control circuitry 404 may receive travel information related to a planned trip from a user. For example, the user may enter destination and origin information via an interface of vehicle 150. In another example, the user may enter destination and origin information via an interface of user device 180. In some embodiments, control circuitry 404 may receive trip origin information from a GPS module of a user device 180.

Process 600 continues at 606, where control circuitry 404 may determine a trip duration value based on the received travel information. For example, control circuitry 404 may send the destination and origin information to a commercial map service (e.g., Google Maps) and receive trip duration information. In some embodiments, control circuitry 404 may use internal map data to calculate the duration of the trip from the origin to the destination data. For example, control circuitry 404 may determine that the trip will take 17 minutes. In some embodiments, control circuitry 404 may then set the trip duration value to the determined duration of the trip (e.g., "17 minutes").

Process 600 continues at 608, where control circuitry 404 may compare the trip duration value to a spoiler time value of a spoiler metadata item associated with a media content item of the set of media content items. For example, control circuitry 404 may compare the spoiler time value of TV show B (e.g., "30 minutes") to the trip duration value (e.g., "17 minutes"). In this example, control circuitry 404 would determine that the spoiler time value duration value exceeds the duration of the trip.

Process 600 continues at 610, where control circuitry 404 may, in response to determining that the spoiler time value exceeds the trip duration value (e.g., at step 608), provide the media content item for display during the planned trip. For example, control circuitry 404 may provide the media content item (e.g., TV Show B) on display 100. In some embodiments, control circuitry 404 may provide the media content item on a display within vehicle 150 (e.g., on windshield 154 or window 152). In some embodiments, control circuitry 404 may provide the media content item on user device 180 that is located within vehicle 150.

Figure 7:
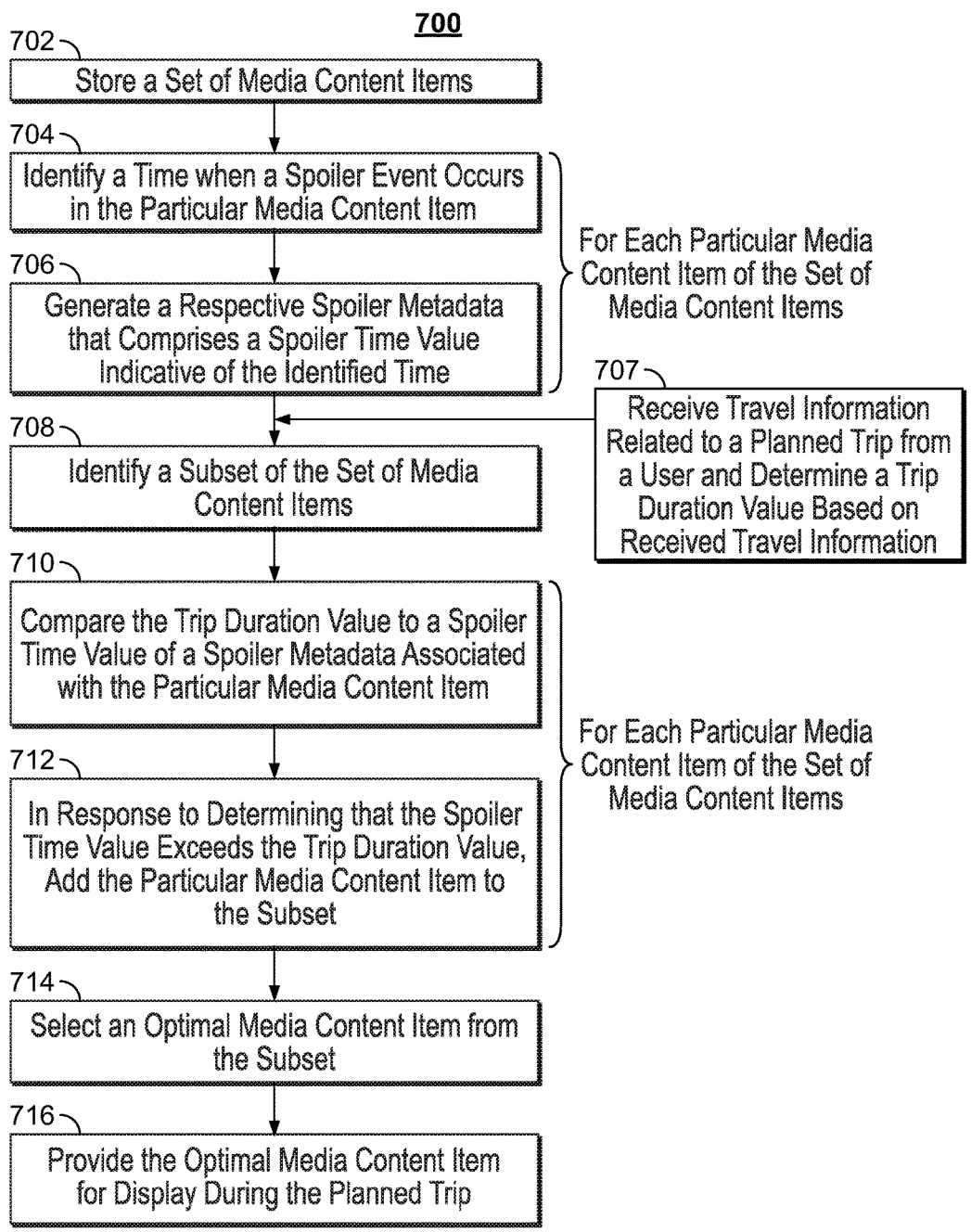
FIG. 7 depicts another illustrative flow diagram for a process of selecting and providing for display a media content item during a trip, in accordance with some embodiments of the disclosure.

FIG. 7 depicts another illustrative flow diagram of a process 700 for selecting and providing for display a media content item during a trip in accordance with an embodiment of the disclosure. Process 700 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 700 begins at 702, where control circuitry 404 may store a set of media content items. For example, control circuitry 404 may maintain a library of media content items in storage 408. In another example, control circuitry 404 may have access to a library of media content items at media content source 516.

Process 700 continues at steps 704-706, which may be performed by the control circuitry 404 for each particular media content item of the set of media content items.

At 704, control circuitry 404 may identify a time when a spoiler event occurs in the particular media content item. For example, control circuitry 404 may receive a time when a spoiler event occurs from a metadata item that was created by a human editor. In some embodiments, control circuitry 404 may analyze other types of available metadata (e.g., social network data) to identity a time when a spoiler event occurs.

At 706, control circuitry 404 may generate a respective spoiler metadata item that comprises a spoiler time value indicative of the identified time. For example, if control circuitry 404 determines that a spoiler event occurs at the 27-minute mark, control circuitry 404 may set the spoiler time value to have a value "27 minutes." In some embodiments, control circuitry 404 may generate a table (e.g., Table 2), that stores spoiler time values for the set of media content items (e.g., Movie A, Movie B, and TV Show A).

TABLE 2

| Media Content Item | Spoiler Time Value | Spoiler Description |
| --- | --- | --- |
| Movie A | 30 minutes | Villain revelation |
| Movie B | 25 minutes | Mystery revelation |
| TV Show A | 35 minutes | Character being alive revelation |

Process 700 continues at step 707, where control circuitry 404 may receive travel information related to a planned trip from a user and determine a trip duration value based on the received travel information.

In some embodiments, control circuitry 404 may receive travel information entered by the user via an interface of vehicle 150 or via user device 180. For example, a user may use a mobile app or interface of an autonomous vehicle to request a ride from a geographical point A (e.g., user's home) to geographical point B (e.g., user's place of work). In some embodiments, the control circuitry 404 may then receive the geographical locations of points A and B from the mobile application or from the vehicle 150. In some embodiments, the media guidance application may determine the location of point A based on GPS data received from a user device (e.g., user device 180), or from a vehicle (e.g., vehicle 150) that picks up the user for the trip.

In some embodiments, control circuitry 404 may determine a trip duration value based on the received travel information by calculating how long it would take to drive from geographical point A to geographical point B. In some embodiments, control circuitry 404 may use an internal map system for the determination. In some embodiments, the control circuitry 404 may send the data about geographical points A and B to a commercial map service (e.g., Google Maps) and receive information about how long the trip from point A to point B is expected to take (e.g., 27 minutes). In some embodiments, control circuitry 404 may then set the trip duration value to how long the trip from point A to point B is expected to take, e.g., to a value of "27 minutes."

Process 700 continues at step 708, where control circuitry 404 may identify a subset of the set of media content items. For example, control circuitry 404 may select the subset based on the spoiler time values (e.g., values listed in the second column of Table 2) and the trip duration value. For example, control circuitry 404 may identify a subset of the set of media content items by optionally performing steps 710-712, which may be performed by the control circuitry 404 for each particular media content item of the set of media content items.

At 710, control circuitry 404 may, for each particular media content item, compare the trip duration value to a spoiler time value of a spoiler metadata term associated with the particular media content item. For example, if the trip duration value is "27 minutes," control circuitry 404 may determine that the spoiler time values of Movie A and TV show A exceed the trip duration value, while the spoiler time value of Movie B does not exceed the trip duration value.

At 710, control circuitry 404 may, for each particular media content item, in response to determining that the spoiler time value exceeds the trip duration value, add the particular media content item to the subset. For example, control circuitry 404 may add Movie A and TV show A to the subset, while Movie B is not added to the subset.

Process 700 continues at step 714, where control circuitry 404 may select an optimal media content item from the subset. For example, control circuitry 404 may select between an optimal item from the subset that contains Movie A and TV show A. In some embodiments, control circuitry 404 may utilize a user profile stored on storage 408 to make the selection. In some embodiments, control circuitry 404 may select a media content item from the subset that is based on that media content having an associated spoiler time value that is closest to the trip duration value. For example, Movie A may have a spoiler time value (e.g., "30 minutes") that is closer to the trip duration value (e.g., "27 minutes") than TV show A that has a spoiler time value of "35 minutes." In this example, control circuitry 404 may select Movie A as the optimal media content item.

Process 700 continues at step 716, where control circuitry 404 may provide the media content item for display during the planned trip. For example, control circuitry 404 may provide the media content item (e.g., TV Show A) on display 100. In some embodiments, control circuitry 404 may provide the media content item on a display within vehicle 150 (e.g., on windshield 154 or window 152). In some embodiments, control circuitry 404 may provide the media content item on user device 180 that is located within vehicle 150.

Figure 8:
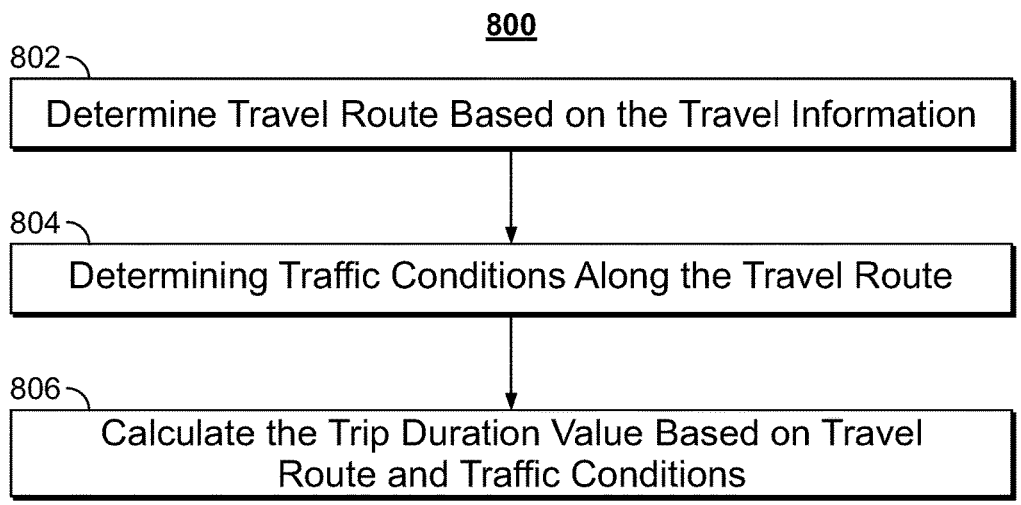
FIG. 8 depicts an illustrative flow diagram for a process of determining a trip duration value, in accordance with some embodiments of the disclosure.

FIG. 8 depicts an illustrative flow diagram of a process 800 for the process of determining a trip duration value, in accordance with some embodiments of the disclosure. Process 800 may be executed by control circuitry 404, for example, in a manner instructed to control circuitry 404 by the media guidance application. In some embodiments, process 800 is executed as a part of block 707.

Process 800 begins at 802, where control circuitry 404 may determine the travel route based on the travel information. For example, control circuitry 404 may receive information about geographical point of the user's origin and information about the geographical point of the user's destination. For example, the points may be received as a part of a user request for a taxi service or for a trip via an autonomous vehicle. In some embodiments, control circuitry 404 may then use map data to determine the travel route (e.g., turn-by-turn directions) between the two geographical points.

Process 800 continues at 804, where control circuitry 404 may determine traffic conditions along the travel route. In some embodiments, control circuitry 404 may access stored historical traffic data along the route identified by the turn-by-turn directions. For example, for each segment of the route, control circuitry 404 may clarify the traffic as light, medium or heavy.

Process 800 continues at 804, where control circuitry 404 may calculate the trip duration value based on travel route and traffic conditions. For example, for each segment of the route identified by the turn-by-turn directions, control circuitry 404 may calculate a segment time value based on the length of the segment and associated traffic conditions. In some embodiments, control circuitry 404 may sum up the segment time value to determine the trip duration value.

Figure 9:
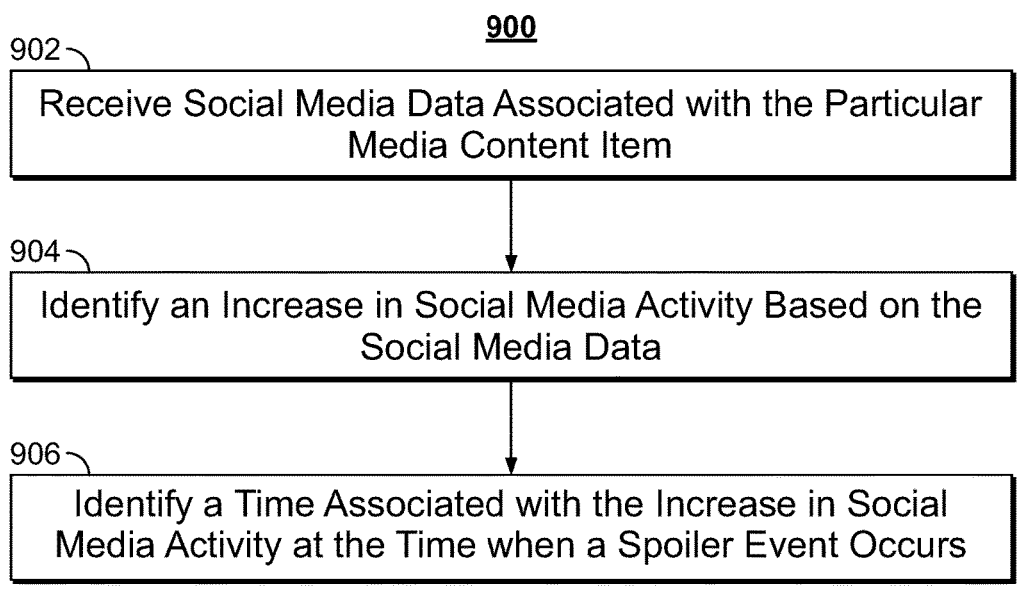
FIG. 9 depicts an illustrative flow diagram for a process of determining a spoiler time value, in accordance with some embodiments of the disclosure.

FIG. 9 depicts an illustrative flow diagram of a process 900 for the process of determining a spoiler time value, in accordance with some embodiments of the disclosure. Process 900 may be executed by control circuitry 404, for example, in a manner instructed to control circuitry 404 by the media guidance application. In some embodiments, process 900 is executed as a part of block 706.

Process 900 begins at 902, where control circuitry 404 may receive social media data associated with the particular media content item. For example, control circuitry 404 may receive a log of mentions of the particular media content item on a social media site (e.g., Twitter, Facebook, etc.). For example, if the particular media content item is Movie A, control circuitry 404 may receive a log of social media posts referring the Movie A during a time period when movie A was broadcast on a television network. For example, the data may be in a form a table (e.g., Table 3) listing the number of mentions of Movie A at different times during the broadcast of movie A.

TABLE 3

| Time | Number of Social Media Posts |
|---|---|
| 28:00 minutes | 20,000 |
| 29:00 minutes | 21,500 |

TABLE 3-continued

| Time | Number of Social Media Posts |
|---|---|
| 30:00 minutes | 50,000 |
| 31:00 minutes | 21,000 |
| 32:00 minutes | 20,500 |

Process 900 continues at 904, where control circuitry 404 may identifying an increase in social media activity based on the social media data. For example, control circuitry 404 may determine that social media activity related to Movie A sharply spiked at 30-minutes mark (e.g., sharply increased from baseline of ~20,000 mentions to 50,000 mentions).

Process 900 continues at 906, where control circuitry 404 may identify a time associated with the increase in social media activity during the time period when a spoiler event occurs. For example, control circuitry 404 may determine that the movie A contains a spoiler event at the 30-minute mark due to the social media increase at that time point. In some embodiments, control circuitry 404 may then set the spoiler time value for movie A as "30 minutes."

Figure 10:
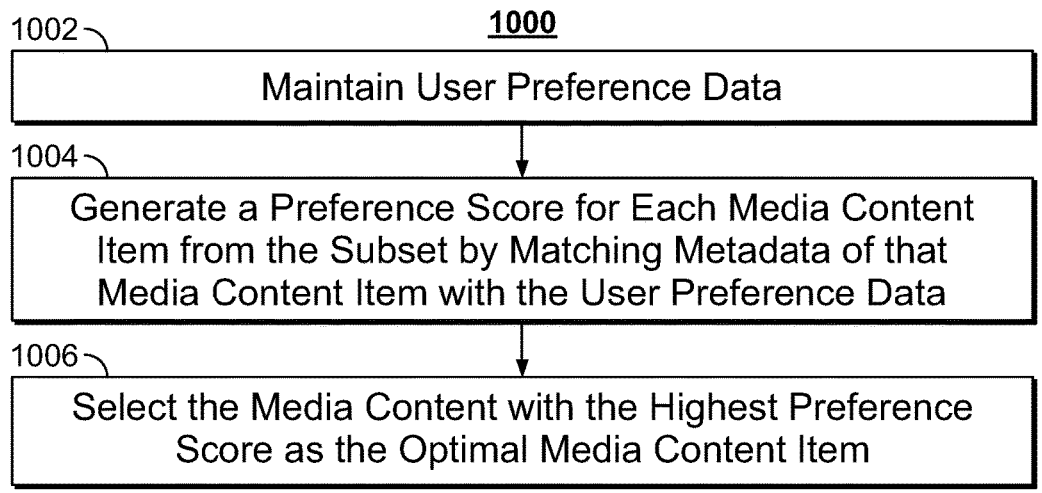
FIG. 10 depicts an illustrative flow diagram for a process of selecting a media content item, in accordance with some embodiments of the disclosure.

FIG. 10 depicts an illustrative flow diagram of a process 1000 for the process of selecting a media content item, in accordance with some embodiments of the disclosure. Process 1000 may be executed by control circuitry 404, for example, in a manner instructed to control circuitry 404 by the media guidance application. In some embodiments, process 1000 is executed as a part of block 714.

Process 1000 begins at 1002, where control circuitry 404 may maintain user preference data. For example, user preference data may be stored on storage 408 or media guidance data source 518. In some embodiments, the user preference data may include metadata tags related to user preferences. For example, user preference data may contain a list of preferred genres (e.g., "Comedy," "Drama," etc.), preferred actors, preferred languages, any other preference data, or any combination thereof.

Process 1000 continues at 1004, where control circuitry 404 may generate a preference score for each media content item from the subset by matching metadata item of that media content item with the user preference data. For example, the subset may include movie A and TV show A (e.g., as outlined in Table 2). In this example, control circuitry 404 may compare the metadata of Movie A to the user preference data to generate a respective preference score. Control circuitry 404 may also compare the metadata of TV show A to the user preference data to generate a respective preference score. In some embodiments, the more word matches occur, the higher the score may be. For example, Movie A may have a metadata tag "comedy" which matches the tag "Comedy" in the user preference data, while TV show A may lack such a tag. In this case, Movie A may receive a higher preference score than TV show A.

Process 1000 continues at 1006, where control circuitry 404 may select the media content item with the highest preference score as the optimal media content item. In one example, control circuitry 404 may select Movie A as the optimal media content because it has a higher preference score than TV show A.

Figure 11:
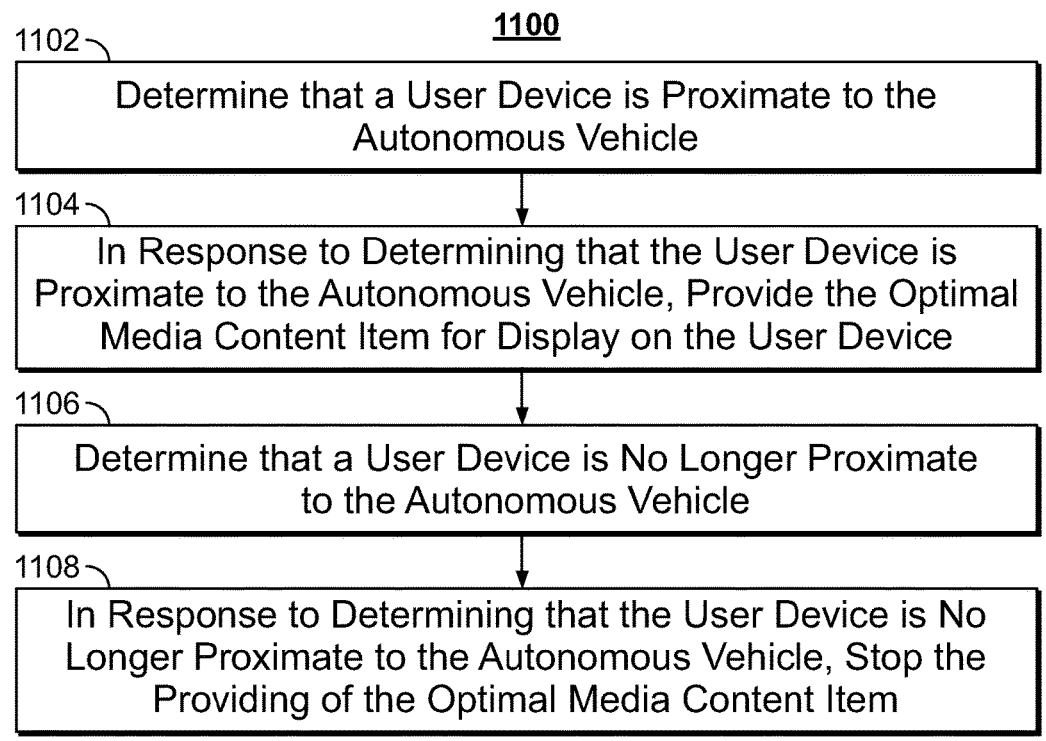
FIG. 11 depicts an illustrative flow diagram for a process of starting and resuming providing for display a media content item, in accordance with some embodiments of the disclosure.

FIG. 11 depicts an illustrative flow diagram of a process 1100 for the process of starting and resuming providing for display a media content item, in accordance with some embodiments of the disclosure. Process 1100 may be executed by control circuitry 404, for example, in a manner instructed to control circuitry 404 by the media guidance application. In some embodiments, process 1100 may be performed when the planned trip comprises a trip via an autonomous vehicle (e.g., vehicle 150).

Process 1100 begins at 1102, where control circuitry 404 may determine that a user device is proximate to the autonomous vehicle. For example, control circuitry 404 may receive GPS data from the user device (e.g., user device 180) and from the autonomous vehicle (e.g., vehicle 150) and calculate whether the distance between the GPS locations corresponds to a pre-determined threshold (e.g., 1 meter). In another embodiment, control circuitry 404 may detect an NFC interaction between the user device and the vehicle, which may be sufficient to establish proximity. In some embodiments, control circuitry 404 may determine that the user device is inside the autonomous vehicle.

Process 1100 continues at 1104, where control circuitry 404 may, in response to determining that the user device is proximate to the autonomous vehicle, provide the optimal media content item for display on the user device. For example, after control circuitry 404 makes the proximity determination, control circuitry 404 may begin providing the optimal media content item to the display 100, either on user device 180 or on a display built into vehicle 150.

Process 1100 continues at 1106, where control circuitry 404 may determine that a user device is no longer proximate to the autonomous vehicle. For example, the determination may be made based on GPS data from the user device (e.g., user device 180) and from the autonomous vehicle (e.g., vehicle 150), or based on determining an interruption in an NFC interaction between the user device and the vehicle.

Process 1100 continues at 1108, where control circuitry 404 may, in response to determining that the user device is no longer proximate to the autonomous vehicle, stop providing of optimal media content item. For example, control circuitry 404 may determine that the trip has ended because the user device is no longer inside the vehicle. At that point, control circuitry 404 may stop displaying the optimal media content item to the display 100, either on user device 180 or on a display built into vehicle 150. In some embodiments, control circuitry 404 may stop providing the optimal media content item before the time point identified by the spoiler time value. In some embodiments, control circuitry 404 may stop providing the optimal media content item at the time point identified by the spoiler time value even if the trip is not over (e.g., if the user device is still proximate to the vehicle).

Figure 12:
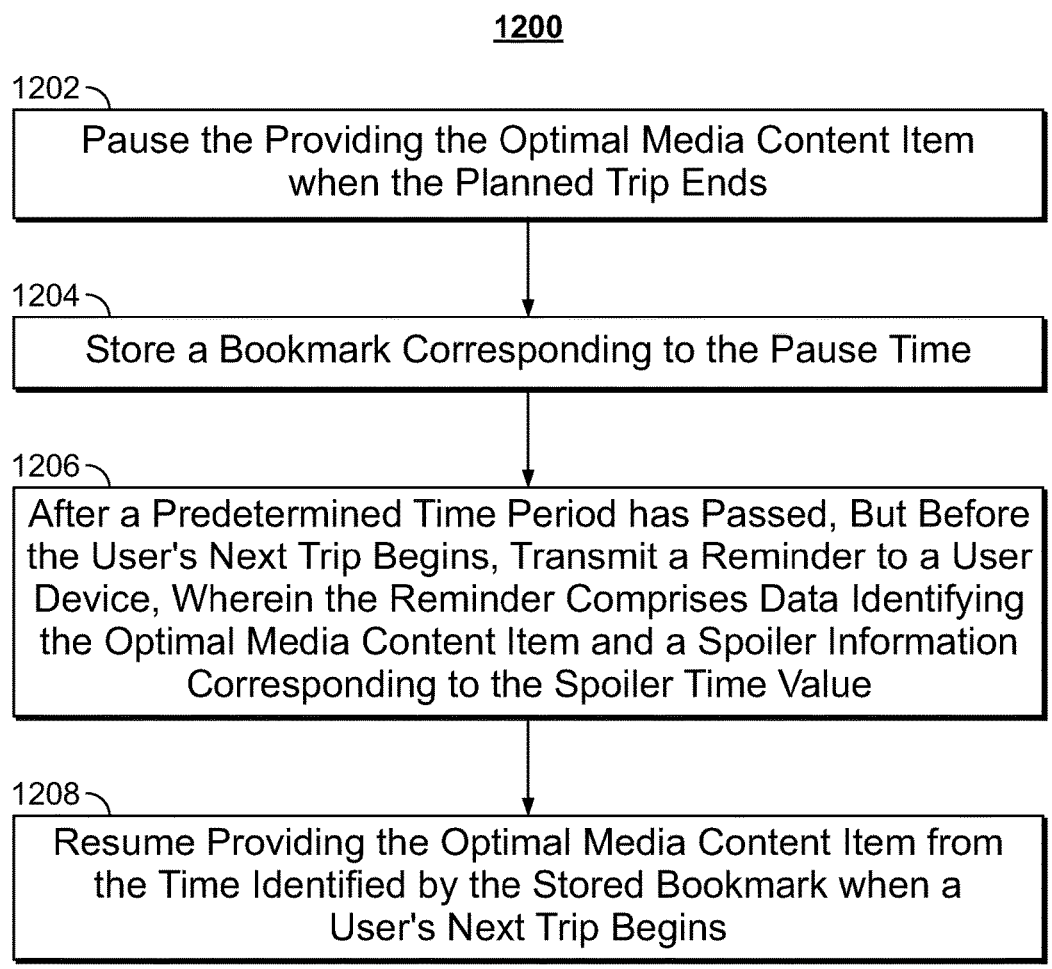
FIG. 12 depicts an illustrative flow diagram for a process of providing a media content item reminder, in accordance with some embodiments of the disclosure.

FIG. 12 depicts an illustrative flow diagram of a process 1200 for the process of providing a media content item reminder, in accordance with some embodiments of the disclosure. Process 1200 may be executed by control circuitry 404, for example, in a manner instructed to control circuitry 404 by the media guidance application. In some embodiments, process 1200 may be performed when the planned trip comprises a trip via an autonomous vehicle (e.g., vehicle 150).

Process 1200 begins at 1202, where control circuitry 404 may pause the providing of the optimal media content item when the planned trip ends. For example, control circuitry 404 may pause the providing of the optimal media content item when control circuitry 404 determines that the user device is no longer proximate to the vehicle (e.g., at step 1106).

Process 1200 continues at 1204, where control circuitry 404 may store a bookmark corresponding to the pause time.

For example, if the optimal media content was paused at the 27-minute mark, control circuitry 404 may store a bookmark with a value "27 minutes."

Process 1200 continues at 1206, where control circuitry 404 may, after a predetermined time period has passed (e.g., two days), but before the user's next trip begins, transmit a reminder to a user device. For example, control circuitry 404 may send a reminder to user device 180 via an SMS message, via e-mail, via an app notification, or via any other network protocol. In some embodiments, the reminder may be displayed on screen 100. In some embodiments, the reminder may comprise data identifying the optimal media content item and spoiler information corresponding to the spoiler time value. For example, if the optimal media content item is Movie A (as shown in Table 2), the control circuitry 404 may retrieve the "Spoiler Description" value associated with Movie A from the Table 2 (e.g., "Villain Revelation") and insert the retrieved data into the reminder. In this example, the reminder may comprise text: "Catch up with movie A where a Villain Revelation will soon occur!"

Process 1200 continues at 1206, where control circuitry 404 may resume providing the optimal media content item from the time identified by the stored bookmark when a user's next trip begins. For example, control circuitry 404 may determine that the user has requested a second trip from the same company that provided the vehicle (e.g., vehicle 150) for the original planned trip. Upon such a determination, control circuitry 404 may resume providing the optimal media content item when the second trip begins (e.g., when the user device becomes proximate to a vehicle that is sent by the same company that provided the vehicle for the original planned trip).

It is contemplated that the steps or descriptions of each of FIGS. 6-12 may be used with any other embodiment of this disclosure. It is contemplated that some steps or descriptions of each of FIGS. 6-12 may be optional and may be omitted in some embodiments. In addition, the steps and descriptions described in relation to FIGS. 6-12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIGS. 6-12.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, or media guidance data source 518.

The processes discussed above in FIGS. 6-12 are intended to be illustrative and not limiting. One skilled in the art would appreciate that the steps of the processes in FIGS. 6-12 discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for selecting media content, the method comprising:
    storing a set of media content items;
    for each particular media content item of the set of media content items:
        identifying a time when a spoiler event occurs in the particular media content item; and
        generating a respective spoiler metadata item that comprises a spoiler time value indicative of the identified time;
    receiving a viewing duration from a user;
    determining a viewing duration value based on the viewing duration;
    identifying a subset of the set of media content items, wherein the identifying comprises:
        for each particular media content item of the set of media content items, comparing the viewing duration value to a spoiler time value of a spoiler metadata item associated with the particular media content item; and
        in response to determining that the spoiler time value exceeds the viewing duration value, selecting the particular media content item.

2. The method of claim 1, wherein determining the viewing duration value comprises:
    determining a travel route based on travel information;
    determining traffic conditions along the travel route; and
    calculating the viewing duration value based on the travel route and the traffic conditions.

3. The method of claim 1, wherein identifying a time when a spoiler event occurs in the particular media content item comprises:
    receiving social media data associated with the particular media content item;
    identifying an increase in social media activity based on the social media data; and
    identifying a time associated with the increase in social media activity during the time when a spoiler event occurs.

4. The method of claim 1, wherein selecting the particular media content item comprises:
    adding the particular media content item to a subset;
    selecting a media content item from the subset; and
    providing the media content item for display, wherein selecting the media content item from the subset further comprises:
        maintaining user preference data;

generating a preference score for each media content item from the subset by matching metadata item of that media content item with the user preference data; and selecting the media content with the highest preference score as the optimal media content item.

5. The method of claim 1, wherein selecting the particular media content item comprises:
adding the particular media content item to a subset;
selecting a media content item from the subset; and
providing the media content item for display, wherein selecting the optimal media content item from the subset further comprises:
identifying the media content item with an associated spoiler time value that is closest to the viewing duration value.

6. The method of claim 2, wherein:
the viewing duration comprises a trip via an autonomous vehicle; and
providing the media content item for display comprises displaying the media content item on a screen within the autonomous vehicle.

7. The method of claim 2, wherein the viewing duration comprises a trip via an autonomous vehicle, wherein the method further comprises:
determining that a user device is proximate to the autonomous vehicle; and
in response to determining that the user device is proximate to the autonomous vehicle, providing the media content item for display on the user device.

8. The method of claim 7, further comprising:
determining that a user device is no longer proximate to the autonomous vehicle; and
in response to determining that the user device is no longer proximate to the autonomous vehicle, stopping the providing of the media content item.

9. The method of claim 1, further comprising:
pausing the providing of the media content item when a viewing ends; and
storing a bookmark corresponding to a pause time.

10. The method of claim 1, further comprising:
transmitting a reminder to a user device, wherein the reminder comprises data identifying the optimal media content item and a spoiler information item corresponding to the spoiler time value.

11. A system for selecting media content the system comprising:
control circuitry configured to:
store a set of media content items;
for each particular media content item of the set of media content items:
identify a time when a spoiler event occurs in the particular media content item; and
generate a respective spoiler metadata item that comprises a spoiler time value indicative of the identified time;
receive a viewing duration from a user;
determine a viewing duration value based on the received a viewing duration;
identify a subset of the set of media content items, wherein the identifying comprises:
for each particular media content item of the set of media content items, comparing the viewing duration value to a spoiler time value of a spoiler metadata item associated with the particular media content item; and in response to determining that the spoiler time value exceeds the viewing duration value, select the particular media content item.

12. The system of claim 11, wherein the control circuitry is configured to determine the viewing value by:
determining a travel route based on travel information;
determining traffic conditions along the travel route; and
calculating the viewing duration value based on the travel route and traffic conditions.

13. The system of claim 11, wherein the control circuitry is configured to identify a time when a spoiler event occurs in the particular media content item by:
receiving social media data associated with the particular media content item;
identifying an increase in social media activity based on the social media data; and
identifying a time associated with the increase in social media activity during the time when a spoiler event occurs.

14. The system of claim 11, wherein the control circuitry configured to select the particular media content item is further configured to:
add the particular media content item to a subset;
select a media content item from the subset; and
provide the media content item for display, and select the media content item from the subset by:
maintaining user preference data;
generating a preference score for each media content item from the subset by matching metadata item of that media content item with the user preference data; and
selecting the media content with the highest preference score as the optimal media content item.

15. The system of claim 11, wherein the control circuitry configured to select the particular media content item is further configured to:
add the particular media content item to a subset;
select a media content item from the subset; and
provide the media content item for display, and select the media content item from the subset by:
identifying the media content item with an associated spoiler time value that is closest to the trip duration value.

16. The system of claim 11, wherein:
the viewing duration comprises a trip via an autonomous vehicle; and
wherein the control circuitry is configured to provide the media content item for display comprises displaying the media content item on a screen within the autonomous vehicle.

17. The system of claim 11, wherein the viewing duration comprises a trip via an autonomous vehicle, wherein the control circuitry is further configured to:
determine that a user device is proximate to the autonomous vehicle; and
in response to determining that the user device is proximate to the autonomous vehicle, provide the media content item for display on the user device.

18. The system of claim 11, wherein the control circuitry is further configured to:
determine that a user device is no longer proximate to the autonomous vehicle; and
in response to determining that the user device is no longer proximate to the autonomous vehicle, stop the providing of the media content item.

19. The system of claim 11, wherein the control circuitry is further configured to:

pause the providing of the media content item when a viewing ends; and store a bookmark corresponding to a pause time.

20. The system of claim 19, wherein the control circuitry is further configured to:

transmit a reminder to a user device, wherein the reminder comprises data identifying the media content item and a spoiler information corresponding to the spoiler time value.

\* \* \* \* \*